(12) United States Patent
Ng-Thow-Hing et al.

(10) Patent No.: US 8,013,852 B2
(45) Date of Patent: Sep. 6, 2011

(54) ANTHROPOMETRY-BASED SKELETON FITTING

(75) Inventors: Victor Ng-Thow-Hing, San Francisco, CA (US); Jianbo Peng, Leonia, NJ (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 1744 days.

(21) Appl. No.: 10/284,798

(22) Filed: Oct. 30, 2002

(65) Prior Publication Data
US 2004/0021660 A1    Feb. 5, 2004

Related U.S. Application Data

(60) Provisional application No. 60/400,650, filed on Aug. 2, 2002, provisional application No. 60/400,798, filed on Aug. 2, 2002.

(51) Int. Cl.
G06T 17/00 (2006.01)
G06T 15/00 (2011.01)
(52) U.S. Cl. ......................... 345/420; 345/419
(58) Field of Classification Search .................. 345/420, 345/473, 474
See application file for complete search history.

(56) References Cited

U.S. PATENT DOCUMENTS

| | | | |
|---|---|---|---|
| 5,852,450 A | 12/1998 | Thingvold | |
| 5,883,638 A | 3/1999 | Rouet et al. | |
| 5,909,218 A | 6/1999 | Naka et al. | |
| 5,982,389 A * | 11/1999 | Guenter et al. | 345/474 |
| 5,990,908 A | 11/1999 | Thingvold | |
| 6,057,859 A | 5/2000 | Handelman et al. | |
| 6,088,042 A | 7/2000 | Handelman et al. | |
| 6,127,672 A | 10/2000 | Danisch | |
| 6,222,560 B1 | 4/2001 | Naka et al. | |
| 6,307,563 B2 | 10/2001 | Kimura | |
| 6,326,972 B1 | 12/2001 | Buhler et al. | |
| 2002/0041285 A1* | 4/2002 | Hunter et al. | 345/474 |
| 2003/0184544 A1* | 10/2003 | Prudent | 345/419 |

FOREIGN PATENT DOCUMENTS

| | | |
|---|---|---|
| JP | 09-330424 | 12/1997 |
| JP | 11-224351 | 8/1999 |
| JP | 2002-123837 | 4/2002 |

OTHER PUBLICATIONS

Allen et al., "Articulated Body Deformation from Range Scan Data", ACM Transactions on Graphics (TOG), Proceedings of the 29th annual conference on Computer graphics and interactive Techniques, Jul. 2002, pp. 612-619.*

(Continued)

*Primary Examiner* — Daniel F Hajnik
(74) *Attorney, Agent, or Firm* — Fenwick & West LLP; Mark E. Duell

(57) ABSTRACT

An efficient technique to build subject-specific skeleton models from external measurements is provided. A generic human skeleton model is manipulated and deformed using marker positional data from human motion-captured sequences. The joint and bone geometry parameters are optimized to construct an estimate of the specific skeleton model of the human subject that originally performed the motion sequence. The scope of the fitting procedure can be adjusted to coincide with a series of smaller optimizations over local bone regions or expanded to a single global optimization over all skeleton geometry and joint parameters simultaneously.

27 Claims, 9 Drawing Sheets

OTHER PUBLICATIONS

Robinette et al., "The Caesar Project: A 3-D Surface Anthropometry Survey", 3-D Digital Imaging and Modeling, 1999. Proceedings. Second International Conference on, Oct. 4-8, 1999, pp. 380-386.*

Park et al., "Human Motion Reconstruction from Inter-Frame Feature Correspondences of a Single Video Stream Using a Motion Library", Proceedings of the 2002 ACM SIGGRAPH/Eurographics symposium on Computer animation, Jul. 21-22, 2002, pp. 113-120.*

Herda et al., "An Automatic Method For Determining Quaternon Field Boundaries for Ball-and-Socket Joint Limits", May 2002, IEEE.*

Bobick et al., "Gait Recognition from Time-normalized Joint-angle Trajectories in the Walking Plane", 2001, IEEE.*

O'Brien et al., "Automatic Joint Parameter Estimation from Magnetic Motion Capture Data", Graphics Interface 2000, pp. 53-60.*

Charles F. Rose III, Peter-Pike J. Sloan, and Michael F. Cohen- "Artist-Directed Inverse-Kinematics Using Radial Basis Function Interpolation", Microsoft Research, EUROGRAPHICS 2001, vol. 20 (2001), No. 3.*

Boulic, R. et al., *Visualization of Local Movements for Optimal Marker Positioning*, Proceedings: First International Workshop on Articulated Motion and Deformable Objects (AMDO), Sep. 7-9, 2000, Palma de Mallorca, Spain, pp. 133-144, Springer.

Herda, L. et al., *Using Skeleton-Based Tracking to Increase the Reliability of Optical Motion Capture*, Human Movement Science Journal 20, 2001, pp. 313-341.

Molet, T. et al., *Human Motion Capture Driven by Orientation Measurements*, Presence, Apr. 1999, vol. 8, No. 2, pp. 187-203, MIT.

Nedel, L. et al., *Anatomic Modeling of Deformable Human Bodies*, The Visual Computer, 2000, vol. 16, No. 6, pp. 306-321, Springer-Verlag.

Villa-Uriol, M. et al., *Image-Based Avatar Reconstruction*, Lake Tahoe Workshop on Collaborative Virtual Reality and Visualization, Oct. 26-28, 2003, Granlibakken, CA, USA.

Weik, S. et al., *Hierarchical 3D Pose Estimation for Articulated Human Body Models From a Sequence of Volume Data*, Proceedings: International Workshop on Robot Vision (RobVis), Auckland, New Zealand, Feb. 16-18, 2001, pp. 27-34, Springer-Verlag.

Norman I. Badler, et al., "Simulating Humans: Computer Graphics, Animation, and Control", Mar. 25, 1999, Chapters 1-3, pp. 1-99, Oxford University Press, Philadelphia, PA, U.S.A.

Andrew Dainins, C3d (coordinate 3d) file format [online], [retrieved on Feb. 25, 2003]. Retrieved from the Internet:<http://www.c3d.org>.

Michael Gleicher, "Retargeting Motion to New Characters", Autodesk Vision Technology Center, Mountain View, CA, USA, 1998.

Craig Lawrence, et al., "User's Guide for CFSQP Version 2.5", Apr. 1997, pp. 1-70, University or Maryland, College Park, MD, U.S.A.

MoCap Solver, Motion Analysis Corporation, Santa Rosa, CA, U.S.A.

Poser 4 User Guide, Curious Labs, Inc., pp. 1-364, 2000.

Thomas Sederberg, et al., "Free-Form Deformation of Solid Geometric Models", ACM SIGGRAPH '86, vol. 20, No. 4, pp. 151-160, 1986, Dallas, TX, U.S.A.

Marius-Calin Silaghi, et al., "Local and Global Skeleton Techniques for Optical Motion Capture", IFIP CapTech '98, pp. 1-15, Nov. 26-28, 1998, Geneva, Switzerland.

Yang Song, et al., "Monocular Perception of Biological Motion—Detection and Labeling", Proceedings of ICCV '99, pp. 805-812, 1999, Corfu, Greece.

Christopher L. Vaughan, et al., "Dynamics of Human Gait", $2^{nd}$ Edition, 1999, Kiboho Publishers, Western Cape, South Africa.

D'Apuzzo, N. et al., "Modeling Human Bodies from Video Sequences,"*Proceedings of the SPIE Conference on Videometrics VI,* Dec. 1998, pp. 36-47, vol. 3641, San Jose, California, USA.

European Patent Office Examination Report, European Patent Application No. 03766704.5, Nov. 26, 2010, twelve pages.

European Patent Office Supplementary European Search Report, European Patent Application No. 03766704.5, Sep. 3, 2010, six pages.

Herda, L. et al., "Skeleton-Based Motion Capture for Robust Reconstruction of Human Motion," *Proceedings of Computer Animation,* May 3-5, 2000, pp. 77-83, New Jersey, USA.

Japanese Office Action, Japanese Patent Application No. P2004-525821, Aug. 7, 2008, six pages.

Japanese Office Action, Japanese Patent Application No. P2004-525821, Nov. 19, 2008, six pages.

Molet, T. et al., "A Real Time Anatomical Converter for Human Motion Capture,"*Proceedings of the Eurographics Workshop on Computer Animation and Simulation,* Aug. 31, 1996, pp. 79-94, 218-219.

Su, S-W., "3ds Max 4 Complete Guide", 1st Edition, Mar. 5, 2002, pp. 555-559, OHM Co., Ltd., Japan.

* cited by examiner

ANTHROPOMETRY-BASED SKELETON FITTING

RELATED APPLICATIONS

This application is related to U.S. provisional patent application Ser. No. 60/400,650, filed on Aug. 2, 2002, entitled "Skeleton Fitting from External Measurements," and U.S. provisional patent application Ser. No. 60/400,798, filed on Aug. 2, 2002, entitled "Anthropometry-based Skeleton Fitting," from which priority is claimed under 35 U.S.C. §119(e) and both of which are incorporated by reference herein in their entireties.

TECHNICAL FIELD

This invention relates to skeleton fitting and, more particularly, to constructing a subject-specific model from a generic human skeleton.

BACKGROUND

Skeleton fitting techniques are used to adjust the parameters of a skeleton model to achieve a subject-specific result. One potential use for a subject-specific skeleton is the simulation of the subject's motion and subsequent analysis of the motion and its derived data, such as joint torques, muscle forces, or muscle energetics. A subject-specific skeleton should be tailored to the subject's physical and geometric parameters to produce an accurate and precise simulation. Conventional techniques of producing subject-specific skeletons suffer from a number of limitations.

In one conventional skeleton fitting process, a generic skeleton is manually and uniformly manipulated. This technique can produce an inaccurate result because human beings are not proportional. For example, applying a global scaling factor to a generic skeleton can generate incorrect individual segment sizes. In contrast to global scaling, some conventional techniques scale segments individually. These techniques can use motion-captured marker data to perform a one-dimensional (lengthwise) bone fitting. However, a subject-specific representation using a one-dimensional approximation typically does not match the subject's anthropometric body parameters because three-dimensional information is lost.

Another limitation of conventional skeleton fitting techniques is the inflexibility of the generic skeleton. In the implementation of conventional skeleton fitting techniques, a particular generic skeleton can become tightly integrated with the fitting process. Accordingly, improvements or changes to the generic skeleton can be difficult to integrate into the conventional fitting technique. The particular generic skeleton may also have limited joint types, for example, revolute joints with 3 degrees of freedom, which further limits the accuracy of the subject-specific model.

Although some optimization techniques exist for performing skeleton fitting from motion-captured marker data, these conventional techniques have several drawbacks. For example, one such conventional optimization technique is limited to estimating joint transformations (e.g., joint angles). Another conventional technique is limited because individual characteristics of bones are not accounted for.

What is needed is an apparatus and method that: (1) automatically constructs and scales a skeleton from motion-captured marker data; (2) applies to wide array of joint types; (3) optimizes joint transformations and bone geometric scale parameters in 3-dimensions using individualized factors; and (4) modularizes the integration of the generic skeleton.

SUMMARY OF THE INVENTION

One embodiment of the present invention provides a method for constructing a subject-specific skeleton from data measured from real human subjects. Anthropometric data for an individual can be obtained from various sources; however, motion-capture techniques provide a non-invasive means of acquiring data about the subject. The marker positions captured during a motion-captured sequence include information about the three-dimensional shapes of limbs. An optimization fitting module can use the marker positional data to transform a parameterized generic skeleton into a subject-specific skeleton. A subject-specific skeleton can be used, for example, in the development of customized products that are tailored to an individual's physical and geometric parameters.

In an embodiment of the present invention, a skeleton fitting process uses an established mapping between the external measurements (e.g., motion-captured marker positions) on the real-world subject and their counterparts on a generic skeleton (e.g., virtual markers). An objective function is constructed to define the sum of squared distances between the positions of virtual markers on the generic skeleton and the positions of external measurements from the subject. A least-squares optimizer then performs an optimization on the objective function. To produce a subject-specific skeleton, the least-squares distance between the virtual markers on the generic skeleton and the actual markers is minimized by scaling the bones and rotating or positioning the joint degrees of freedom of the generic skeleton.

In another embodiment of the present invention, constraints equations can be generated and applied to the least-squares optimizer. Constraints equations include, for example, anthropometric scaling constraints on bone or joint parameters and search space constraints, such as enforcing bilateral symmetry of body segments. Constraining the search space can improve the convergence of the solution. Further, marker weights can be used to enhance the efficiency of the skeleton fitting process.

In further embodiments of the present invention, the skeleton fitting process can be applied globally to the entire set of joint and bone parameters or as a series of local, smaller optimizations where each optimization is restricted to a subset of bone and joint parameters. A local optimization embodiment includes selecting optimization variables that correspond to a subset of the available bone or joint parameters. A global optimization embodiment includes selecting optimization variables that correspond to all segments in the generic skeleton in order to optimize all available parameters concurrently.

Further features of the invention, its nature and various advantages will be more apparent from the accompanying drawings and the following detailed description.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION OF THE EMBODIMENTS

Figure 1:
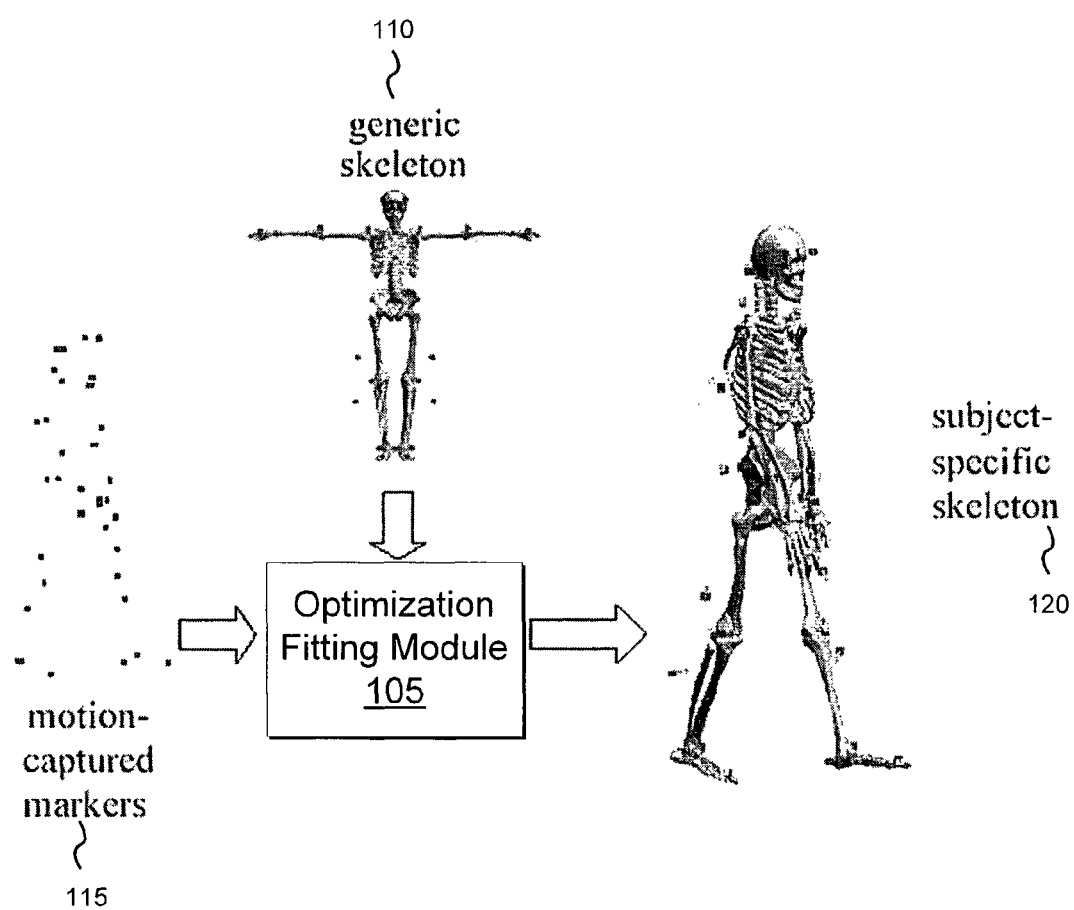
FIG. 1 is a block diagram of a skeleton fitting process according to one embodiment of the present invention.

Embodiments of the present invention are now described with reference to the accompanying figures, where like reference numerals indicate identical or functionally similar elements. Also in the figures, the left most digit of each reference numeral corresponds to the figure in which the reference numeral is first used.

A. Skeleton Fitting Process Overview

Subject-specific skeleton models can be constructed from data measured from real human subjects. The subject-specific skeleton can be used for developing accurate human simulations of individuals. Anthropometric information for an individual can be obtained from various sources, such as marker positions from motion-captured sessions or length measurements between various identifiable landmarks on a person. When compared with the direct measurement of limb lengths, the marker positions of a motion-captured sequence contain more information about the three-dimensional shapes of limbs. Marker positions can provide information about the location of parts of the skeleton within the subject's body. In an embodiment of the present invention, this anthropometric information is used to construct a subject-specific skeleton.

FIG. 1 is a block diagram of a skeleton fitting process according to one embodiment of the present invention. According to one embodiment of the present invention, an optimization process is used to transform a generic skeleton or model into a subject-specific skeleton or model. For example, as illustrated in FIG. 1, a skeleton fitting process includes an optimization fitting module 105. The optimization fitting module 105 includes as input: a generic skeleton 110 and data signals generated by the motion-captured markers 115. The optimization fitting module 105 optimizes the parameters of generic skeleton 110 (e.g., bone and joint parameters) with motion-captured markers 115 to generate a subject-specific skeleton 120. Further details of the optimization fitting module 105 are provided below.

In some embodiments of the present invention, the generic skeleton 110 is decoupled from the optimization fitting module 105. That is, the optimization fitting module 105 can be configured to process a vector of values representing the degrees of freedom of the generic skeleton 110 (e.g., bone and joint parameters). The skeleton fitting framework described herein, therefore, can be applied to the generic skeleton 110 at different levels of detail. A modular generic skeleton 110 permits changes or improvements, such as new joint types, to be incorporated into embodiments of the invention without significantly affecting the implementation of the optimization fitting module 105.

B. Generic Skeleton

1. Skeleton Parameters

In some embodiments of the present invention, the generic skeleton 110 includes design characteristics to provide adequate degrees of freedom to handle inter-subject variability. Furthermore, universal constraints in the topology and structure of human bodies can be used to reduce the number of parameters necessary to describe an articulated skeleton. In addition to bones, the generic skeleton description includes the joint transformation relationships between bones of a skeleton, and can include attached muscles, tendons, ligaments, and other soft tissues. In one embodiment of the present invention, the generic skeleton 110 is a modified geometric human skeleton model derived from version 4.0 of the Poser software system, which is commercially available from Curious Labs, Inc., Santa Cruz, Calif. The Poser software system skeleton model can be modified to include adjustable parameters for both the joint parameters and the bone geometry parameters. Some conventional generic models for skeletons are limited to adjustable joint parameters, preventing the resizing of the bone geometry. One skilled in the art will appreciate that embodiments of the present invention can apply to many generic skeletons. For example, different bone models can be used or different joint articulations can be added or removed. Further details describing the building of generic human skeletons are found in, for example, Badler, N. I., Phillips, C. B., and Webber, B. L. *Virtual Humans and Simulated Agents*. Oxford University Press, 1992, which is incorporated by reference herein in its entirety.

According to one embodiment of the present invention, a skeleton comprises a set of rigid and deformable elements. For the generic skeleton 110, the rigid elements are termed segments. Each segment, s can have an orthonormal transformation matrix, $_sT$ which specifies the position and orientation of the segment in three-dimensional space. A transformation can be specified relative to the world coordinate system, $_s^wT$ or relative to another segment p's coordinate system, $_s^pT$. The transformation relative to another segment can be used in a hierarchical representation for an articulated skeleton, where distal segments have their transformations relative to more proximal segments. For example, the position and orientation of the tibia bone is expressed relative to its parent segment, the femur. In addition to the rotation and translation transformations of each segment, a segment, s can also have a local deformation, $D_s(\phi_s)$ applied to it that can be a non-rigid transformation with a parameter $\phi_s$, wherein $\phi_s=[x_s\ y_s\ z_s]^T$. For example, Equation 1 defines a local non-uniform scaling along the three body-fixed axes.

$$D_s(\phi_s) = G_s([\ x_s\ y_s\ z_s\ ]^T) = \begin{bmatrix} x_s & 0 & 0 \\ 0 & y_s & 0 \\ 0 & 0 & z_s \end{bmatrix} \quad (1)$$

One skilled in the art will appreciate that additional geometric deformations, such as free-form deformations, can be applied to model other bone deformities such as twisting and bending. Free-form deformations are described, for example, in Sederberg, T. W. and Parry, S. R. "Free-Form Deformation of Solid Geometric Models," *Computer Graphics (SIGGRAPH '86 Proceedings)*, Evans, David C. and Athay, Russell J., eds., vol. 20, pp. 151-160, August 1986, which is incorporated by reference herein in its entirety.

2. Skeleton Partitioning

Figure 2:
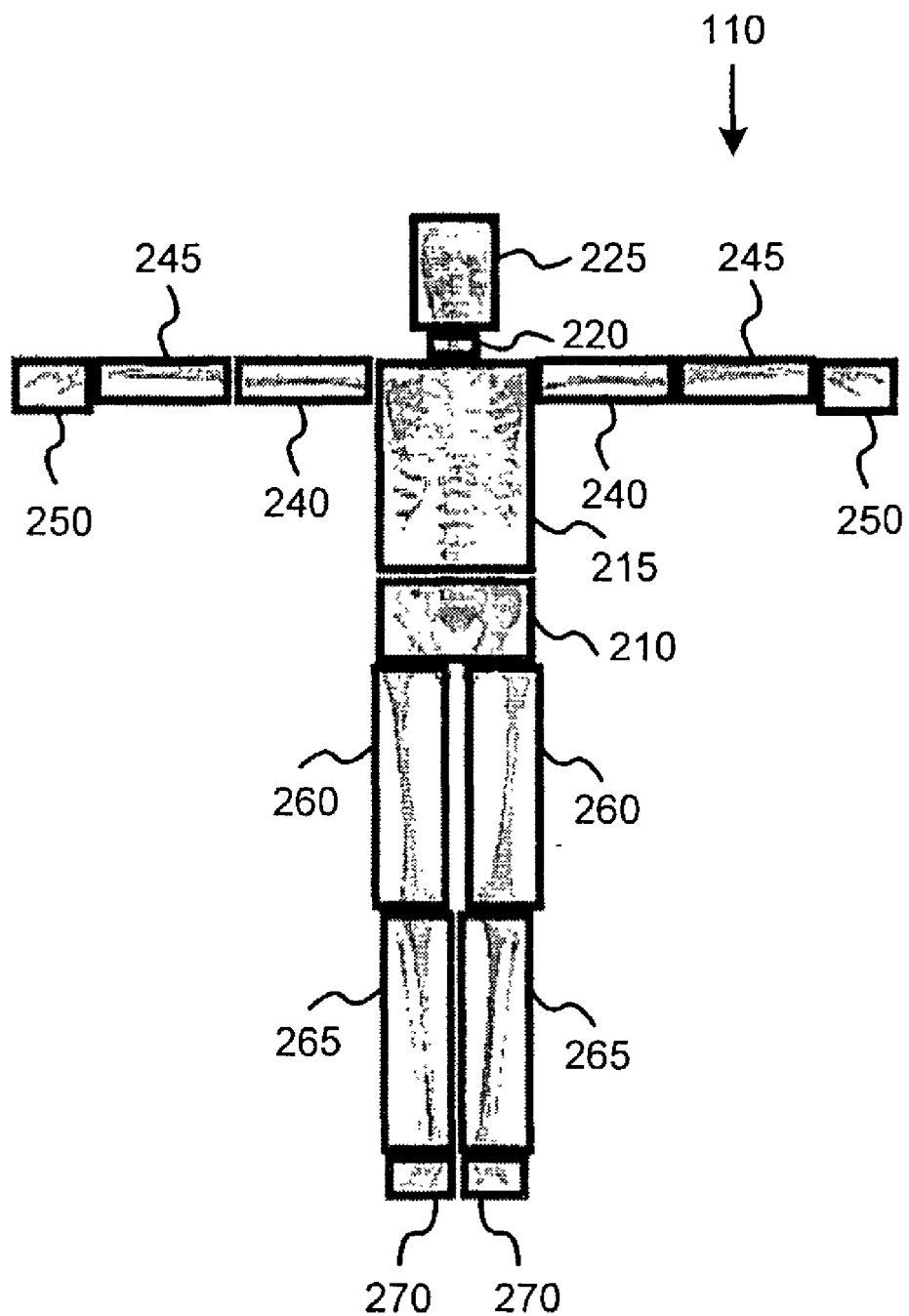
FIG. 2 is an illustration of a partitioned generic skeleton according to one embodiment of the present invention.

FIG. 2 is an illustration of a partitioned generic skeleton according to one embodiment of the present invention. In this example, the bones of the generic skeleton 110 can be partitioned into 16 segments. The skeleton's trunk includes four segments: hip 210, chest 215, neck 220, and head 225. Each of the two arms includes three segments: upper arm 240, lower arm 245, and hand 250. Each of the two legs includes three segments: upper leg 260, lower leg 265, and foot 270.

For visualization of a skeletal model, any geometric primitive (e.g., parametric objects, triangle meshes) can be displayed in the coordinate system of each segment. In an embodiment of the present invention, triangle meshes are used for bones because, as one skilled in the art will recognize, such data is readily available for the human skeleton. Multiple bones displayed in a single segment can be considered to be welded together for a particular motion or task. For example, the tarsal bones of the foot 270 can be modeled as being fused together in a single segment for simplicity.

3. Skeleton Topology

Figure 3:
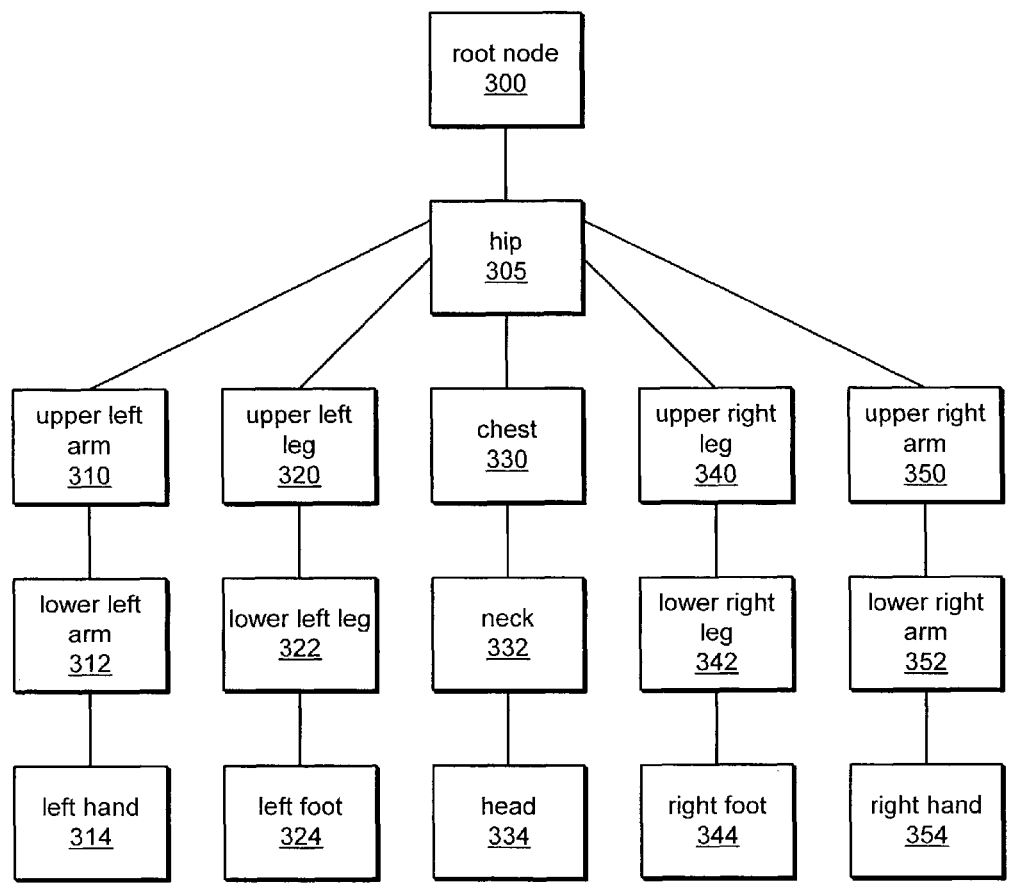
FIG. 3 is a diagram of skeleton segment dependencies according to one embodiment of the present invention.

FIG. 3 is a diagram of skeleton segment dependencies according to one embodiment of the present invention. The joint transformations can be any arbitrary transformation between coordinate systems of segments that can be described by a set of parameters. In FIG. 3, a tree topology is shown to describe the human skeleton. A root node 300 describes the transformation between the hip 305 (i.e., the pelvic bone) and the world coordinate system or ground coordinate system. The hip 305 is described with a six degree-of-freedom (dof) joint for position and orientation. All other joints are revolute joints with one, two, or three axes of rotation. Descending the topology from the hip 305 includes: upper left arm 310, lower left arm 312, left hand 314, upper left leg 320, lower left leg 322, left foot 324, chest 330, neck 332, head 334, upper right leg 340, lower right leg 342, right foot 344, upper right arm 350, lower right arm 352, and right hand 354.

In an embodiment of the present invention, joints are specified between two adjacent segments. For example, the joint between the upper right arm 350 and the lower right arm 352 is a 1 degree-of-freedom revolute joint. A segment that is closer to the root node 300 is termed inboard or parent, with the other adjacent segment is termed outboard or child. Although the joints illustrated in the example of FIG. 3 are between two segments, embodiments of the present invention can allow joints to comprise of dependent relationships between more than two segments.

Figure 4:
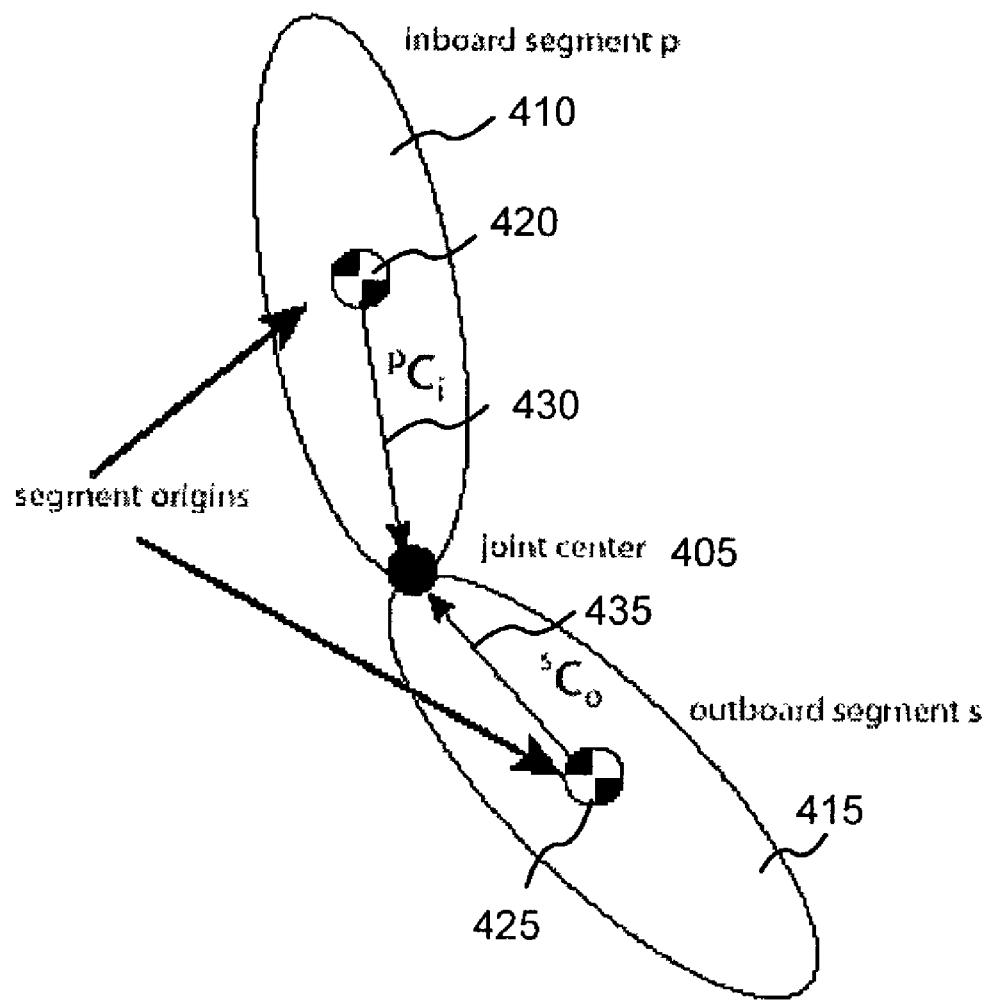
FIG. 4 is a diagram of a joint including position vectors according to one embodiment of the present invention.

FIG. 4 is a diagram of a joint including position vectors according to one embodiment of the present invention. The illustrated example includes a joint center 405 at the common point of articulation between an inboard segment p 410 and an outboard segment s 415. Also illustrated are an origin 420 of the inboard segment p 410, an origin 425 of the outboard segment s 415. Each joint transformation can be expressed locally, relative to its inboard segment. Each joint includes the joint center 405, which is considered the local origin of the transformation. The inboard and outboard segments 410, 415 include position vectors 430 and 435, $c_i$ and $c_o$ respectively. The position vectors 430 and 435 position the joint center 405 relative to each segment's coordinate system. The actual motion of the joint can be described by a set of parameters (the degrees of freedom) that specify the configuration of the joint. For example, a three-axis revolute joint can be determined by three rotation angles, $\phi_x$, $\phi_y$, $\phi_z$ and an implicit rotation order (e.g., xyz order: rotate about x-axis, then y-axis, then z-axis). This rotation can then be described as a local transformation matrix, $_sR$, for a segment as described in Equation 2. One skilled in the art will appreciate that in an embodiment of the present invention the degrees of freedom of each joint can be limited to a finite range, for example, to model physiological joint limits.

$$T_s = {_sR}(\theta_x, \theta_y, \theta_z) \qquad (2)$$

C. Motion-Captured Marker Data

In one embodiment of the present invention, motion-captured marker data comprises a set of labeled markers corresponding to body surface or palpable bony landmarks. Each marker has a sampled series of positions over time, collectively known as its trajectory. Some embodiments of the present invention use the Helen Hayes Hospital marker set described in Vaughan C. L., Davis, B. L., and O'Connor, J. C. *Dynamics of Human Gait*. Kiboho Publishers, 2nd ed., 1999, which is incorporated by reference herein in its entirety, because it contains marker positions that correspond to palpable bony landmarks. One skilled in the art will appreciate that other marker sets that can used to provide information about the location of parts of the skeleton within the subject's body. As the markers contain trajectories for the duration of the captured motion sequence, the variation of distances between markers can give information about the relative rigidity of marker positions in a motion sequence. In contrast to using marker data, the lengths from measured anthropometric data from a static pose can contain errors that appear, for example, when an entire sequence of motion is studied.

In an embodiment of the present invention, the correspondences between markers and their positions on selected body parts are pre-established. One skilled in the art will recognize that techniques exist for constructing a labeled marker set from unlabeled markers. One such technique is described in Song, Yang, Goncalves, Luis, Di Bernardo, Enrico, and Perona, Pietro "Monocular Perception of Biological Motion—Detection and Labeling," *Proceedings of ICCV '99*, pp. 805-812, 1999, which is incorporated by reference herein in its entirety.

1. Marker Data Format

Marker data sets are conventionally available in the coordinate 3-D (C3D) file format, which is described in Dainis, Andrew "C3d (Coordinate 3d) File Format," [online], 2001, retrieved from the Internet: <URL:http://www.c3d.org>. The C3D format is a standard format for motion-captured information used primarily in the field of biomechanics. C3D files are in a binary format, and therefore are not directly human-readable. In one embodiment of the present invention, a parser is used to extract the marker labels and their positions over time and to write this information into a text file format called the Motion Captured Data (MCD) format. An advantage of the MCD format over C3D are its human-readability, extensibility, and ease of parsing the file format. For very large data sets, the C3D binary format benefits from smaller storage requirements and faster loading times compared to a text-based format. One skilled in the art will recognize that embodiments of present invention are not dependent on a particular file format or data structure for processing marker data. Motion-captured data of various walking sequences were obtained and used to perform embodiments of the skeleton fitting process as described in further detail below. Table 1 includes an example of a MCD file that illustrates details of the data structure.

TABLE 1

Example MCD file format

```
# Comment begins at '#' and ends with a new line symbol.
# These fields should be in double precision:
# subject.height, subject.weight, frame.rate, frame.data
# Date should be in format mm/dd/yyyy.
subject {                                  # basic info about the subject
    name Jack Chen                         # subject name, maxlength = 63
    gender m                               # m(ale), f(emale), n(ot available)
    dob 01/01/1966                         # date of birth
    height 180                             # height (unit: mm)
    weight 85                              # weight (unit: kg)
}
header {                                   # basic info about the data
    project XYZ                            # project name, maxlength = 63
    date 01/01/2001                        # date of data collection
}
frame {                                    # motion capture data
    label 6 FX1 FY1 FZ1 MX1 MY1 MZ1
                                           # number and name of labels
    dimension 1                            # 1(analog) or 3(position)
    rate 120                               # frame rate (unit: Hz)
    size 2                                 # number of frames
    data                                   # frame data, one frame per line
                                           # the order of data matches that of label
        2034 2057 2082 2065 2078 2018      # frame 0
        2032 2056 2078 2064 2075 2014      # frame 1
                                           # more . . .
}
frame {                                    # motion capture data
    label 2 RASI LASI                      # number and name of labels
    dimension 3                            # 1(analog) or 3(position)
    rate 60                                # frame rate (unit: Hz)
    size 2                                 # number of frames
    data                                   # frame data, one frame per line
                                           # the order of data matches that of label
                                           # for positions, each label has three values
                                           # (X, Y, Z) per frame
        158 2855 968 467 2881 957          # frame 0
        156 2834 968 465 2865 962          # frame 1
                                           # more . . .
}
# end of file.
```

2. Placement of Virtual Markers

Figure 5:
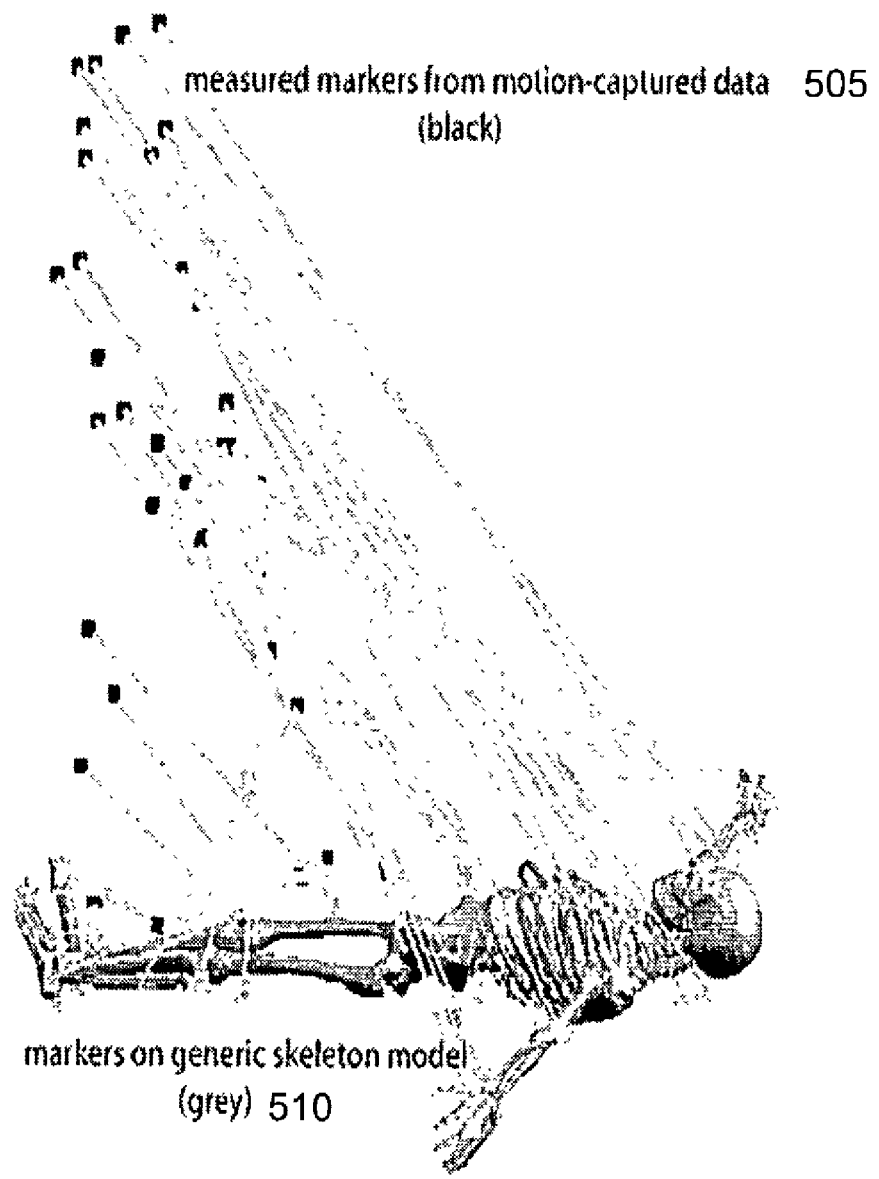
FIG. 5 is an illustration of a generic skeleton with virtual marker mappings according to one embodiment of the present invention.

FIG. 5 is an illustration of a generic skeleton with virtual marker mappings according to one embodiment of the present invention. In FIG. 5, measured markers 505 from motion-captured data are shown mapped as virtual markers 510 to corresponding positions on the generic skeleton. That is, according to an embodiment of the present invention, a set of virtual markers is located on the generic skeleton in positions corresponding to their real positions on a human subject. The measured markers 505 can be offset from the bones in various areas to account for intervening soft tissue such as muscle or fat. When selecting markers, emphasis should be placed on locating them at palpable bony landmarks because their location can be specifically referenced on the bones of the skeleton. The procedure for placing on a human subject standard marker sets like the Helen Hayes Hospital marker set is described in Vaughan C. L., Davis, B. L., and O'Connor, J. C. *Dynamics of Human Gait*. Kiboho Publishers, 2nd ed., 1999, which is incorporated by reference herein in its entirety.

In an embodiment of the present invention, the optimization process described below seeks to minimize the total squared distance between the virtual markers 510 and their real counterparts, the measured markers 505. The positioning of the virtual markers 510 can affect the results of the fitting process, and consequently the accuracy of the estimated segment positions and orientations. One skilled in the art will recognize that sensitivity analysis of the marker positions can be done to determine how dependent the final skeleton configuration is on changes in the marker positions. In addition, alternate optimization criteria can be used.

D. Skeleton Fitting Process

Figure 6:
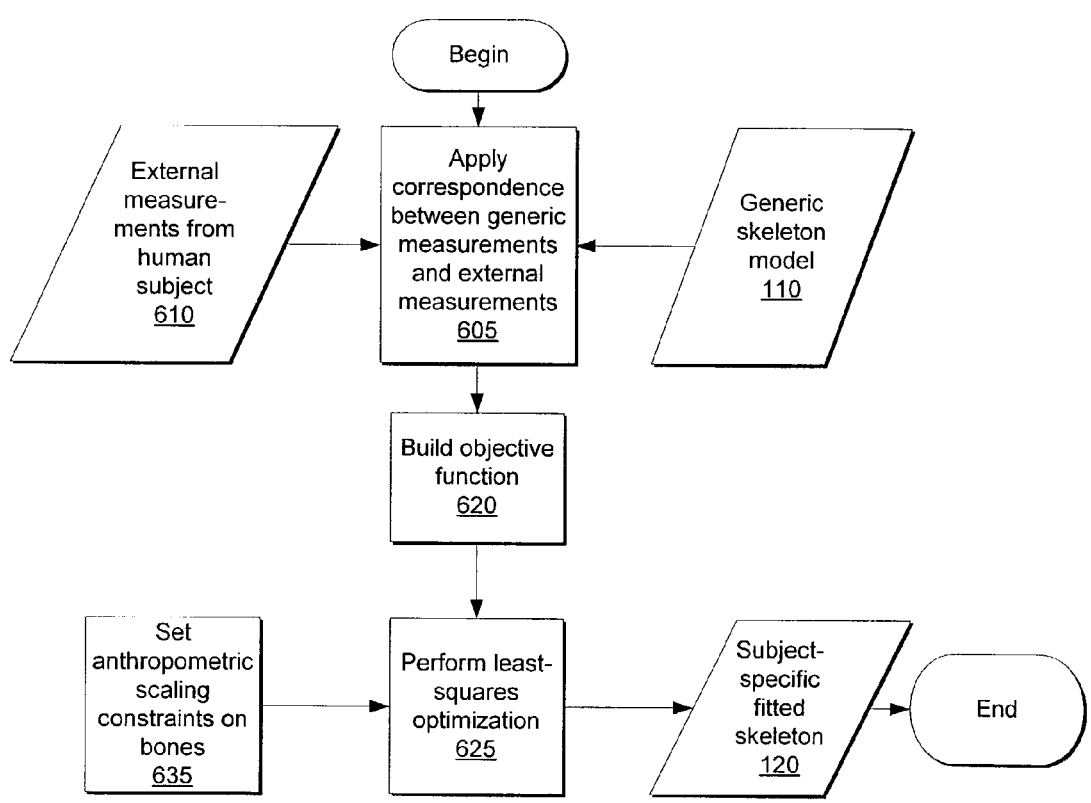
FIG. 6 is a block diagram illustrating an optimization fitting module according to one embodiment of the present invention.

As described above in an embodiment of the present invention, optimization fitting module 105 implements a skeleton fitting process that transforms the generic skeleton 110 into the subject-specific skeleton 120. One use for the subject-specific skeleton 120 is product development that benefits from mass-produced subject-specific simulations. FIG. 6 is a block diagram illustrating an optimization fitting module according to one embodiment of the present invention. The optimization fitting module 105 implements a process that begins with applying correspondence between generic measurements and external measurements 605. That is, the virtual markers 510 are associated with their real world counterparts. External measurements from human subject 610 and the generic skeleton model 110 are provided as input to the process. In one embodiment of the present invention, the external measurements from human subject 610 are the motion-captured marker data 115 in Motion Capture Data (MCD) format as described in additional detail above. Next, an objective function 620 is built. The objective function 620 can be defined to be the sum of squared distances between the positions of the virtual markers 510 on the generic skeleton and the positions of the external measurements from human subject 610 for a given optimization i. In one embodiment of the present invention, a least-squares optimization is then performed 625 on the objective function 620 to produce the subject-specific fitted skeleton 120. Anthropometric scaling constraints on bones can be set 635 for the optimization variables of least-squares optimization 625 to limit the size of the bones and the joint angles to physiologically reasonable values. Further details of the skeleton fitting process are described below and with reference to FIG. 8.

Figure 7:
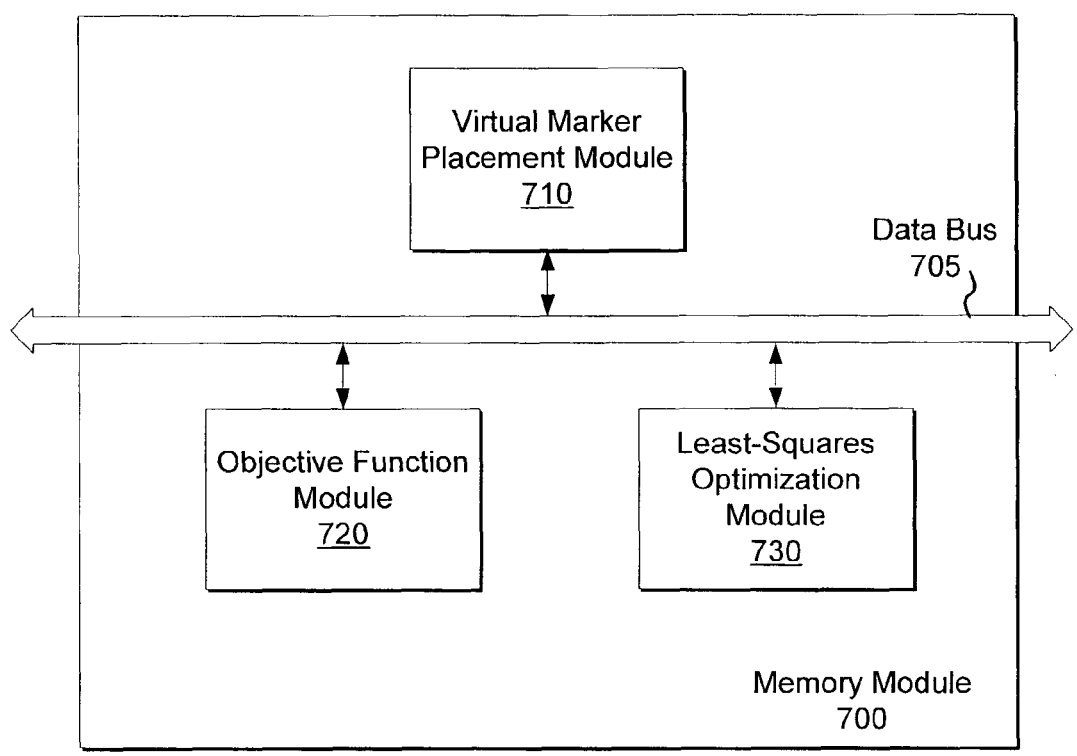
FIG. 7 is a functional block diagram of a memory module according to one embodiment of the present invention.

FIG. 7 is a functional block diagram of a memory module according to one embodiment of the present invention. In an embodiment of the present invention, a memory module 700 is a functional unit of a computing device. The memory module 700 can comprise software modules of executable program instructions. A data bus 705 provides an input/output interface to other functional units, for example, a central processing unit (not illustrated). In the embodiment illustrated in FIG. 7, the memory module 700 includes a virtual marker placement module 710, an objective function module 720, and a least-squares optimization module 730. The virtual marker placement module 710 includes program instructions for applying correspondence between the generic measurements and the external measurements 605. The objective function module 720 includes program instructions for implementing the objective function 620, which is the sum of squared distances between the positions of the virtual markers 510 on the generic skeleton and the positions of external measurements from human subject 610. The least-squares optimization module 730 includes program instructions for manipulating the parameters of the generic skeleton 110 to fit the skeleton with an optimal bone and joint configuration. In one embodiment of the present invention, the least-squares optimization module 730 is the Feasible Sequential Quadratic Programming (CFSQP) nonlinear least-squares solver, which is commercially available from AEM Design, Inc., Tucker, Ga. One skilled in the art will appreciate, however, that the optimization method does not depend on a particular implementation of a nonlinear least-squares solver and other optimization techniques can be implemented.

Although embodiments of the present invention are described in discrete steps or modules, one skilled in the art will appreciate that the features or the functionalities of the present invention can be implemented in a variety of ways. For example, the present invention can be implemented using program instructions executing on a general-purpose computing device, an application-specific, computing device, or in hardware (e.g., an integrated circuit). The program instructions can be distributed on a computer readable medium or storage volume. The computer readable storage volume can be available, for example, via a public network, a private network, or the Internet. Program instructions can be in any appropriate form, such as source code, object code, or scripting code.

1. Process Notation

Before describing additional details of embodiments of the skeleton fitting process that is performed by optimization fitting module 105, some notation is described. If one has n real markers, denoted $m_i$, i=0, ..., n−1, there is a corresponding set of n virtual markers, denoted $v_i$, i=0, ..., n−1. In a motion sequence comprising several time samples or frames of animation, then $m_{i,j}$ refers to the $i^{th}$ marker position at frame j of the sequence. The same subscripting applies to virtual markers. The position of virtual markers, $^s v_i$, are represented in local coordinates relative to the unique segment s to which they are attached. The world-coordinate position of a virtual marker can be computed according to Equation 3.

$$^w v_i = {^w_s T} {^s v_i} \quad (3)$$

As described above, the matrix $^w_s T$ represents the position and orientation transformation matrix of segment s relative to the world. In a nested hierarchical articulated skeleton, $^w_s T$ can be computed recursively from its parent segments' transformation matrices as defined in Equation 4. In Equation 4, $^p_s T$ is the is the local transformation matrix of segment s relative to its parent segment p and $^w_p T$ is the position and orientation of segment p relative to the world w.

$$^w_s T = {^w_p T} {^p_s T} \quad (4)$$

As described above and with reference to Equation 1, $D_s$ is a deformation operation applied to all geometry located in the segment s. In an embodiment of the present invention, the deformation is not applied to the geometry of any other segments. For example, setting $D_s(\phi_s) = G_s(x_s, y_s, z_s)$ allows for independent scaling about three axes for each bone segment. According to one embodiment of the present invention, any deformation $D_s(\phi_s)$ defined by parameters $\phi_s$ can be included in the optimization. Each local transformation matrix $^p_s T$ can be defined by a set of degrees of freedom, $\theta_j$ for a joint j. Therefore, $^p_s T(\theta_j)$ represents a local transformation representing the joint configuration $\theta_j$ for joint j. One skilled in the art will appreciate that, in some cases, it is possible for a local transformation to be affected by more than one joint, as in $^p_s T(\theta_k, \theta_l)$. Conversely, a joint can affect multiple segments, such as $_s T(\theta_j)$ and $_p T(\theta_j)$ representing a situation where joint j affects the transformations of both segments s and p.

In an embodiment of the present invention, the optimization process seeks to find the best set of values for the joint degrees of freedom, $\theta_j, \forall j \in J$ and geometric deformations ($\phi_s, \forall s \in S$), where J and S are the set of all joints and segments in the skeleton respectively.

Figure 8:
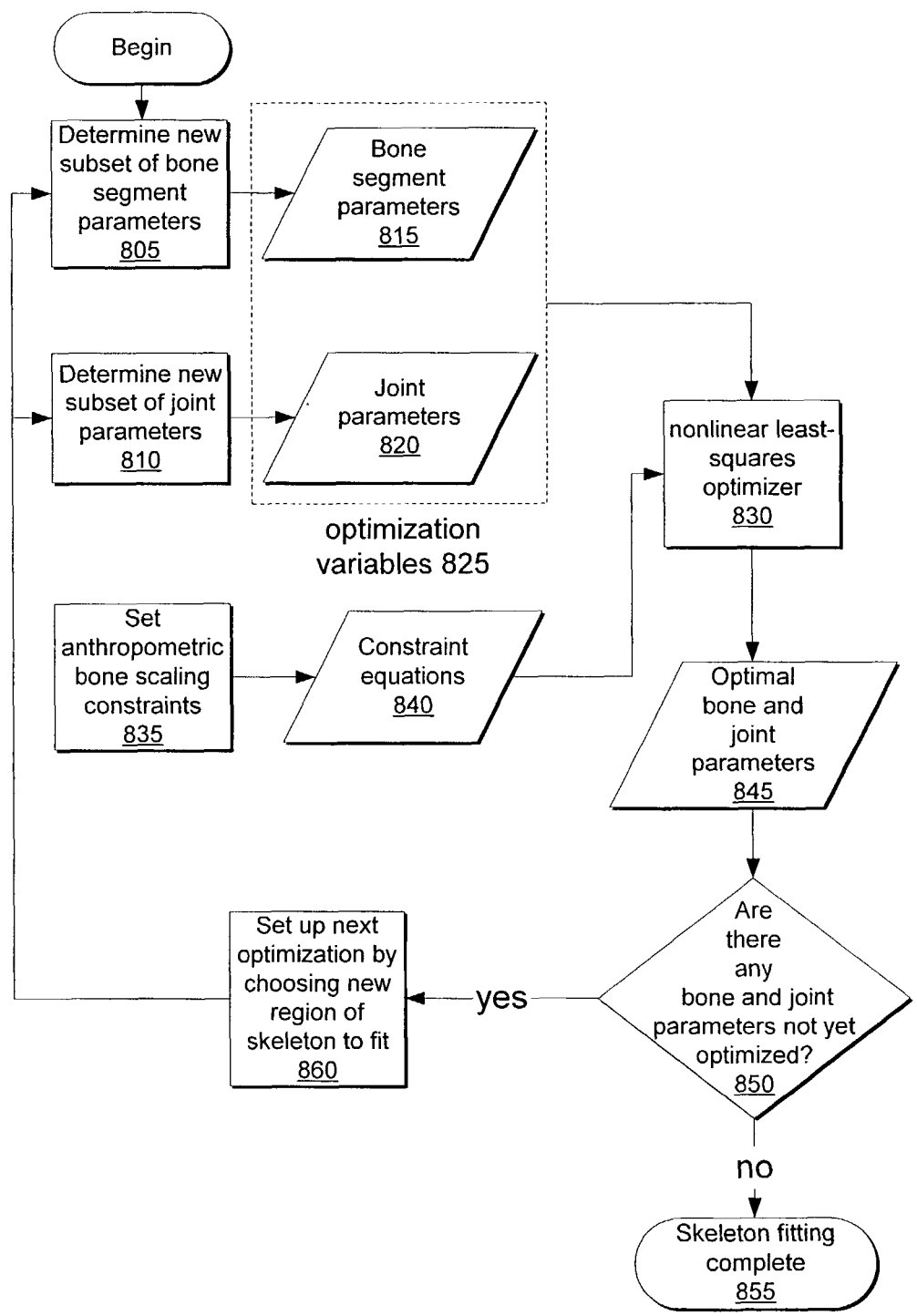
FIG. 8 is a flowchart illustrating a skeleton fitting process according to one embodiment of the present invention.

FIG. 8 is a flowchart illustrating a skeleton fitting process according to one embodiment of the present invention. In the illustrated embodiment, a subset of bone segment parameters is determined 805 and a subset of joint parameters is determined 810 as described below. Bone segment parameters 815 and joint parameters 820 are collectively termed optimization variables 825.

2. Selection of Optimization Variables 825

According to one embodiment of the present invention, the optimization variables 825 are selected by choosing a subset of the various parameters of $\theta$ and $\phi$. The selected parameters can then be concatenated together in one vector, x and the joint transformation and deformation functions rewritten in terms of x to express an objective function in terms of a single state vector. Choosing all possible joint and bone segment parameters results in a single global optimization that adjusts all segments and joint parameters simultaneously. Alternatively, if only a subset of the bones 805 and the joints 810 are chosen, multiple optimizations over different sets of parameters are used to cover adequately the adjustment of all parameters of the generic skeleton 110. For example, embodiments of the present invention implement two optimization processes: a global optimization and a local optimization. The global optimization can be performed by setting $N_t$ to be the set of all segments in the skeleton, optimizing all available parameters simultaneously. The local optimization can perform a set of smaller optimizations over local regions of the skeleton. Nonlinear least-squares optimizer 830 can be configured to perform either a local or global optimization process. A depth first traversal of the skeleton segment tree (see, e.g., FIG. 3) is performed with an optimization performed at each node of the tree. For each optimization, the current node s and its immediate children are set to $N_t$.

In an embodiment of the present invention, the set of parameters for each optimization does not have to be mutually exclusive. For example, one can have several optimizations focusing on separate overlapping regions of the skeleton. The bone segments in each optimization also need not be adjacent. For example, the left and right pairs of corresponding bones on either side of the sagittal plane dividing the skeleton can be done simultaneously. The tradeoff between a large single optimization and many smaller optimizations is increased accuracy of the skeleton fit versus faster completion of the optimization process.

3. Objective Function

An objective function, $f_i(x_i)$, can be defined to be the sum of squared distances between the position of virtual markers 510 on the generic skeleton and the positions of measured markers 505 obtained from a motion-captured human subject for a given optimization i. In each optimization i performed by a nonlinear least-squares optimizer 830, a set of segments $N_i$ are selected for which an optimal set of bone and joint parameters are computed as defined by Equation 5.

$$f_i(x_i) = \sum_{s \in N_i} \sum_{k \in M_s} w_k \| {}_s^w T(x_i) D_s(x_i)^s v_k - m_k \|^2 \tag{5}$$

In Equation 5, $M_s$ is the set of all markers that are associated with segment s. One skilled in the art will recognize that in a typical nested hierarchical skeleton, a small subset of x is used for a segment's deformation functions, $D_s$ and local transformation matrix ${}_s^P T$ (see, e.g., Equations 1 and 4). This allows the partial derivatives of these functions and matrices with respect to elements of x to be computed quickly because one can identify possible non-zero values efficiently. In an embodiment of the present invention, weights, $w_k$, are introduced to allow individual markers to have different levels of influence over the final optimization. Furthermore, the magnitude of these weights affects the number of iterations until the fitting process converges. Weights are described in further detail below and with reference to FIG. 9. Other parameters in x that are not in $x_i$ can be fixed to their current values.

Referring to the embodiment illustrated in FIG. 8, the optimization variables 825 are provided as input to the nonlinear least-squares optimizer 830. Anthropometric bone scaling constraints 835 can be used to generate constraint equations 840. The constraint equations 840 can be provided to the nonlinear least-squares optimizer 830 to constrain joint parameters to physiologically reasonable values and to anthropometrically constrain the size of bones. One skilled in the art will appreciate that it can be advantageous to implement other types of constraints, such as constraining the search space of possible solutions.

Once the nonlinear least-squares optimizer 830 converges to a solution $x_i^*$, the corresponding components of $x_i^*$ in the overall state vector x are set to optimal bone and joint parameter values 845. A determination is made whether there are additional bone and joint parameters not yet optimized 850. If there are no additional parameters to be optimized or each parameter in the skeleton has participated in at least one iteration of optimization, then the skeleton fitting is complete 855. Otherwise, the next optimization is configured by choosing a new region of the skeleton to fit 860. The process returns to step 805 and step 810 where a new subset of the optimization variables 825 is determined. Although embodiments of the skeleton fitting process can transform a generic skeleton 110 into a subject-specific skeleton 120 in a single pass or invocation of the process, one skilled in the art will recognize that it may be advantageous to perform multiple passes of the process. For example, in a two-pass approach the bone segment parameters 815 could be optimized in the first pass and the joint parameters 820 optimized in the second pass.

In an embodiment of the present invention, a gradient-based optimization technique is used. Therefore, one skilled in the art will recognize that the partial derivatives of the objective function of Equation 5 can be computed to build the gradient. Equation 6 defines the partial derivative of Equation 5 with the subscripts for $f$ and N removed for clarity without loss of generality. In Equation 6, $x_k$ is a component of x.

$$\frac{\partial f}{\partial x_k}(x) = \tag{6}$$

$$\sum_{s \in N} \sum_{i \in M_s} 2 w_i ({}_s^w T(x) G_s(x)^s v_i - m_i) \cdot \frac{\partial {}_s^w T(x)}{\partial x_k} G_s(x)^s v_i + {}_s^w T(x) \frac{\partial G_s(x)}{\partial x_k} {}^s v_i$$

The partial derivative of a matrix is performed by taking the partial derivative of every element with respect to the given variable. As described above, constraints can also be set on the search parameters, x. Joint angles and scale factors of the skeleton can be bound to physiological limits. Constraining the search space of possible solutions in this manner improves the solution and reduces the size of the search space. One skilled in the art will recognize that other constraints can be applied on the system to reduce the search space, such as enforcing bilateral symmetry by equating left and right scaling factors of corresponding segments.

4. Computation of ${}_s^w T$

For the global transformation matrix ${}_s^w(x)$ of a segment s, the path from the root node 300 of the segment tree is defined to the segment node s as according to Equation 7, where s is k levels down from the root node 300.

$$s_0, s_1, \ldots, s_k = s, k \geq 1 \tag{7}$$

The matrix ${}_s^w T$ can be computed by repeated matrix multiplication of the joint transformation matrices of all segments in the path as in Equation 4. The local segment transformation, ${}_s^P T$, can be defined as a series of matrix multiplications that converts the joint parameters to a transformation matrix that defines the relative position and orientation of the segments p and s. As described above and with reference to FIG. 4, p is referred to as the inboard segment and s as the outboard segment. The transformation between a segment and its parent can be conceptualized as originating at a common point of articulation of these two segments called the joint center (see, e.g., FIG. 4). The inboard and outboard position vectors for the joint's center, ${}^P c_i$ and ${}^s c_o$, are defined in the local frames of reference of the joint's inboard and outboard segment respectively and a joint transformation matrix, ${}_s^P J$ that positions and orients the segment s with respect to its unique parent segment p from the joint center. By introducing these two position vectors, a joint's center can be independently set in a segment while allowing the segment's origin to remain unchanged. This allows deformation operations, such as the scaling deformation, $G_s$, to be done more intuitively about the segment's origin. The local segment transformation matrix, ${}_s^P T$, can be decomposed as a product of three matrices according to Equation 8, where $\tau(c)$ is a 4×4 translation matrix defined in Equation 9. In Equation 9, $c = [c_x, c_y, c_z]^T$ and ${}_s^P J(x)$ is the joint transformation matrix.

$${}_s^P T(x) = \tau({}^P c_i) {}_s^P J(x) \tau(-{}^s c_o) \tag{8}$$

$$\tau(c) = \begin{bmatrix} 1 & 0 & 0 & c_x \\ 0 & 1 & 0 & c_y \\ 0 & 0 & 1 & c_x \\ 0 & 0 & 0 & 1 \end{bmatrix} \tag{9}$$

Consequently, in an embodiment of the present invention, $_s^w T$ is computed by successive multiplications according to Equation 10, with the segment index i corresponding to the sequence defined in Equation 7 and the matrix T defined as in Equation 8.

$$_s^w T(x) = \prod_{i=0}^{k} {}_{i}^{i-1}T \qquad (10)$$

The index order ensures that segment i−1 is the parent of segment i. Because the root node 300 doesn't have an inboard segment, $^0 c_i$ is equal to 0. As the majority of these matrices are local in nature, each matrix can be a function of a relatively small set of components of the vector x. Therefore, in one embodiment of the present invention, only a small number of non-zero gradient components are stored for each joint and Equation 6 can be computed quickly.

5. Influence of Weights

Figure 9:
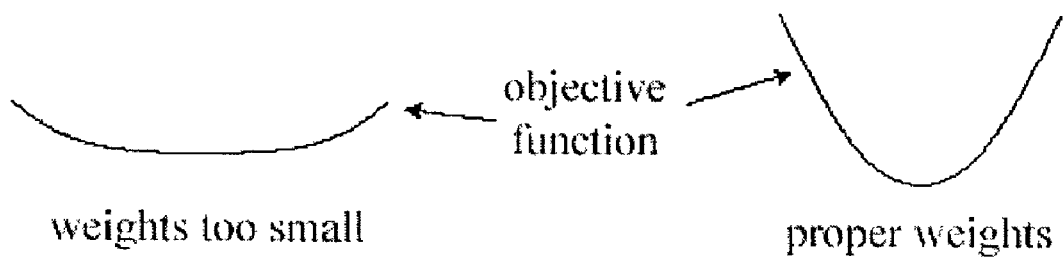
FIG. 9 is a plot of an objective function with marker weights according to one embodiment of the present invention.

FIG. 9 is a plot of an objective function with marker weights according to one embodiment of the present invention. A factor in the efficiency of the optimization is the introduction of the weights, $w_k$, to the objective function of Equation 5. As shown in FIG. 9, excessively small weights can result in a wide and flattened region near the minimal point of the objective function. In these situations, the optimization process may stop prematurely because the optimization solver detects an insufficient change in the objective function. This can result in a calculated solution that is not optimal. Proper marker weights produce a desirable parabolic shape for the objective function near its minimum, increasing the chances of convergence to the optimal solution. Setting the marker weights to the same order of magnitude as the optimization variables can result in fast and robust convergence within error tolerances. Specifically, the weights can be set according to Equation 11, which corresponds to the ratio of the largest marker vector magnitude to the smallest weight value, producing weights that are roughly the same order of magnitude as the marker coordinate values. This ensures that the convexity of the hyperparaboloid in the objective function is not too flat by scaling the gradient of the objective function with the weights $w_i$ (see, e.g., Equation 6).

$$\frac{\max_i \|m_i\|}{\min_j w_j} \leq 1 \qquad (11)$$

E. Example Results

To evaluate the skeleton fitting techniques described herein, the global and local optimization processes were applied to the marker trajectories of a conventional walking sequence of motion-captured data. A two-pass optimization was performed to create a subject-specific skeleton for the walking motion. In the first pass, the optimization was performed on each frame of the walking sequence. The average of the bone geometry scale factors for each segment over all frames was computed. In the second pass, these averaged scale factors were fixed for the entire motion sequence so that only the joint degrees of freedom were optimized in each frame. The justification for the two-pass approach is that the marker positions are subject to vibration and noise that can result in non-rigid bone shapes over a motion sequence. The mean scale factors for bone geometry produced fixed bone geometry that effectively averages out the errors in noise and vibrations due to soft tissues in the motion. In the second pass, optimizations converged quickly because only the joint degrees of freedom were adjusted. When multiple, smaller optimizations were performed over local regions of the skeleton, the skeleton fitting occurred at interactive rates of more than 30 frame-per-second (fps) on a PENTIUM III 933 MHz system. However, overall coherency and smoothness of motion is best achieved with a single global optimization over all the joint and bone segment parameters. One can expand the neighborhood of segments for each optimization to include the parent segments in addition to its children. When a global fitting is applied to the same walking motion sequence, the result is smoother than local fitting. Symmetry constraints can be useful in reducing visual defects, such as the femur of one leg being longer than the other. In some cases, however, there may actually be physical differences in the bone lengths of a person. Segments located at the extremities, such as the hands, can appear too large or too small. The reason for the incorrect segment sizes is the lack of markers to constrain fully the three-dimensional shape of the bones in these regions. Adding additional marker points helps to produce an accurate result. In an embodiment present invention, at least three markers should be placed on each segment to fully capture the rigid bone shape. To further reduce residual errors in the optimization, different deformation functions with more degrees of freedom can be added to the optimization framework. For example, general free-form deformations, more constrained bending and twisting, and localized bone deformations can help to produce an accurate result.

1. Convergence

Analytic gradients of the object function allow convergence to occur quickly because the minimum of the local quadratic approximation to the objective function is better approximated. Consequently, embodiments of the present invention can be extended to other joint transformations or bone deformations if analytical gradients or Jacobians can be computed. In contrast to other gradient-based optimizations, embodiments of the present invention converge robustly, even when the initial guess is far from the optimal configuration. Because the root pelvic segment has a full six degrees of freedom and segments propagate transformations to their children, the optimization of the pelvic segment leads to a configuration that is closer to the global minimum. Adjusting the joint parameters of the generic skeleton 110 from the root node 300 to leaves of a skeleton results in a coarse-to-fine refinement of the optimization's search parameters because segment parameters closer to the root node 300 affect the configuration of more child segments.

Having described embodiments of anthropometry-based skeleton fitting (which are intended to be illustrative and not limiting), it is noted that modifications and variations can be made by persons skilled in the art in light of the above teachings. It is therefore to be understood that changes may be made in the particular embodiments of the invention disclosed that are within the scope and spirit of the invention as defined by the appended claims and equivalents.

What is claimed is:

1. A method for producing a subject-specific skeleton from an external measurement data set and a generic skeleton, the generic skeleton comprising a plurality of parameters, the method comprising:

determining a set of parameters, wherein the set includes a first parameter related to a size of a bone segment in a first dimension and a second parameter related to a size of the bone segment in a second dimension;

applying, for the set of parameters, correspondence between the external measurement data set and the generic skeleton; and determining, for each parameter in the set, a value, by optimizing an objective function.

2. The method of claim 1 further comprising:
selecting a second set of parameters, the parameters corresponding to a region of the subject-specific skeleton; and
determining, for each parameter in the second set, a value, by optimizing a second objective function.

3. The method of claim 2 further comprising:
repeating the selecting the second set and the determining, for each parameter in the second set, a value until each region of the subject-specific skeleton has been optimized.

4. The method of claim 1 further comprising:
constraining the value of a parameter.

5. The method of claim 4 wherein the constraint comprises one of anthropometric bone scaling, search space, and symmetry.

6. The method of claim 1 wherein the objective function includes two weights, each weight associated with a different parameter.

7. The method of claim 1 wherein optimizing further comprises performing a nonlinear least-squares optimization.

8. The method of claim 1 wherein the set includes every parameter of the generic skeleton.

9. The method of claim 1 wherein the set does not include every parameter of the generic skeleton.

10. The method of claim 1 wherein the set further includes a third parameter related to a size of the bone segment in a third dimension.

11. The method of claim 1 wherein the external measurement data set comprises motion-captured marker data.

12. An apparatus for producing a subject-specific skeleton from an external measurement data set and a generic skeleton, the generic skeleton comprising a plurality of parameters, the apparatus comprising:
a virtual marker placement module configured to determine a set of parameters, wherein the set includes a first parameter related to a size of a bone segment in a first dimension and a second parameter related to a size of the bone segment in a second dimension, and to apply, for the set of parameters, correspondence between the external measurement data set and the generic skeleton; and
an optimization module for determining, for each parameter in the set, a value, by optimizing an objective function.

13. The apparatus of claim 12 wherein the virtual marker placement module is further configured to select a second set of parameters, the parameters corresponding to a region of the subject-specific skeleton.

14. The apparatus of claim 12 wherein the optimization module is further configured to constrain the value of a parameter.

15. The apparatus of claim 14 wherein the constraint comprises one of anthropometric bone scaling, search space, and symmetry.

16. The apparatus of claim 12 wherein wherein the objective function includes two weights, each weight associated with a different parameter.

17. The apparatus of claim 12 wherein the optimization module comprises a nonlinear least-squares optimizer.

18. The apparatus of claim 12 wherein the set includes every parameter of the generic skeleton.

19. The apparatus of claim 12 wherein the set does not include every parameter of the generic skeleton.

20. The apparatus of claim 12 wherein the set further includes a third parameter related to a size of the bone segment in a third dimension.

21. The apparatus of claim 12 wherein the external measurement data set comprises motion-captured marker data.

22. An apparatus for producing a subject-specific skeleton from an external measurement data set and a generic skeleton, the generic skeleton comprising a plurality of parameters, the apparatus comprising:
means for determining a set of parameters, wherein the set includes a first parameter related to a size of a bone segment in a first dimension and a second parameter related to a size of the bone segment in a second dimension;
means for applying, for the set of parameters, correspondence between the external measurement data set and the generic skeleton; and
means for determining, for each parameter in the set, a value, by optimizing an objective function.

23. A non-transitory computer readable medium for producing a subject-specific skeleton from an external measurement data set and a generic skeleton, the generic skeleton comprising a plurality of parameters, the computer readable medium comprising:
program instructions for determining a set of parameters, wherein the set includes a first parameter related to a size of a bone segment in a first dimension and a second parameter related to a size of the bone segment in a second dimension;
program instructions for applying, for the set of parameters, correspondence between the external measurement data set and the generic skeleton; and
program instructions for determining, for each parameter in the set, a value, by optimizing an objective function.

24. The non-transitory computer readable medium of claim 23 further comprising:
program instructions for selecting a second set of parameters, the parameters corresponding to a region of the subject-specific skeleton; and
program instructions for determining, for each parameter in the second set, a value, by optimizing a second objective function.

25. The non-transitory computer readable medium of claim 24 further comprising:
program instructions for repeating the selecting the second set and the determining, for each parameter in the second set, a value until each region of the subject-specific skeleton has been optimized.

26. The method of claim 1 further comprising:
producing the subject-specific skeleton based on the determined values.

27. The apparatus of claim 12 further comprising:
a production module configured to produce the subject-specific skeleton based on the determined values.

* * * * *